(12) United States Patent
Chen et al.

(10) Patent No.: US 9,906,772 B2
(45) Date of Patent: Feb. 27, 2018

(54) METHOD FOR PERFORMING MULTI-CAMERA CAPTURING CONTROL OF AN ELECTRONIC DEVICE, AND ASSOCIATED APPARATUS

(71) Applicant: MEDIATEK INC., Hsin-Chu (TW)

(72) Inventors: Ding-Yun Chen, Taipei (TW); Cheng-Tsai Ho, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 254 days.

(21) Appl. No.: 14/552,465

(22) Filed: Nov. 24, 2014

(65) Prior Publication Data

US 2016/0150215 A1    May 26, 2016

(51) Int. Cl.
  *H04N 13/02* (2006.01)
  *H04N 5/232* (2006.01)
  *H04N 13/00* (2018.01)

(52) U.S. Cl.
  CPC ..... *H04N 13/0239* (2013.01); *H04N 5/23219* (2013.01); *H04N 5/23293* (2013.01); *H04N 13/0022* (2013.01); *H04N 13/0203* (2013.01); *H04N 13/0242* (2013.01)

(58) Field of Classification Search
  CPC ........... H04N 13/0239; H04N 13/0022; H04N 5/23293; H04N 13/0242; H04N 13/0203
  See application file for complete search history.

(56) References Cited

U.S. PATENT DOCUMENTS

| 2006/0284996 | A1* | 12/2006 | Kanai | H04N 5/232 348/294 |
| 2012/0094754 | A1* | 4/2012 | Suzuki | A63F 13/10 463/30 |
| 2012/0236129 | A1* | 9/2012 | Yamaji | H04N 5/23219 348/50 |
| 2013/0050519 | A1* | 2/2013 | Lee | H04N 5/2355 348/222.1 |
| 2013/0162786 | A1* | 6/2013 | Kosakai | G03B 35/02 348/50 |

(Continued)

FOREIGN PATENT DOCUMENTS

CN    1788497 A    6/2006
CN    102055998 A    5/2011

*Primary Examiner* — Neil Mikeska
(74) *Attorney, Agent, or Firm* — Oblon, McClelland, Maier & Neustadt, L.L.P.

(57) ABSTRACT

A method for performing multi-camera capturing control of an electronic device and an associated apparatus are provided, where the method can be applied to the electronic device. The method may include the steps of: obtaining a plurality of preview images, wherein the plurality of preview images are generated by using at least one lens module of the electronic device; generating at least one distance-related index according to characteristics of the plurality of preview images; and according to the aforementioned at least one distance-related index, selectively controlling whether to allow multi-camera capturing or controlling whether to output warning information. For example, when it is detected that a specific distance-related index within the aforementioned at least one distance-related index falls within a predetermined range, a notification which indicates that a multi-camera capturing function of the electronic device is allowed to be triggered may be output, in order to guarantee the overall performance.

21 Claims, 8 Drawing Sheets

(56) References Cited

U.S. PATENT DOCUMENTS

| | | | |
|---|---|---|---|
| 2013/0307939 A1* | 11/2013 | May | G03B 17/565 348/49 |
| 2013/0329068 A1* | 12/2013 | Hamanaka | H04N 5/23293 348/218.1 |
| 2014/0049614 A1* | 2/2014 | Yamada | H04N 5/2226 348/46 |
| 2014/0211045 A1* | 7/2014 | Tanaka | H04N 5/2621 348/239 |
| 2014/0267618 A1* | 9/2014 | Esteban | G06T 5/003 348/46 |

* cited by examiner

METHOD FOR PERFORMING MULTI-CAMERA CAPTURING CONTROL OF AN ELECTRONIC DEVICE, AND ASSOCIATED APPARATUS

BACKGROUND

The present invention relates to stereo capturing, and more particularly, to a method for performing multi-camera capturing control of an electronic device, and an associated apparatus.

A conventional portable electronic device such as a conventional multifunctional mobile phone can be designed to perform stereo capturing, and therefore can be referred to as a stereo camera phone or a three dimensional (3D) camera phone. More particularly, the conventional portable electronic device may capture two images (or two video clips) to simulate the stereo vision through the two eyes of somebody (e.g. the user of the conventional portable electronic device), and then perform some operations of a conventional stereo processing method, such as image refocusing operations, according to the two images (or the two video clips). However, some problems such as side effects may occur. For example, a conventional application (or a conventional design) regarding the conventional stereo processing may require a working distance between a captured object and the conventional portable electronic device to fall within a specific range, but does not have the capability to determine when this specific range is satisfied, where the specific range may be between sixty centimeters (cm) and two meters (m). If the working distance falls outside the specific range, the correctness of the processing results of the conventional stereo processing cannot be guaranteed.

In order to solve the problems of the working distance, a conventional method is proposed in the related art. According to this conventional method, a message (e.g. the text string "Please put the captured object between 60 cm and 2 m") may be displayed first before the user starts using the conventional application. For example, when the conventional portable electronic device runs the conventional application and displays this message, it is "ready" for the user to use it, and then the user may use the conventional portable electronic device to capture images (or video clips). Afterward, the conventional portable electronic device running the conventional application typically starts the conventional stereo processing according to what is just captured, no matter whether the working distance falls within the specific range for the conventional application. As a result, the processing results of the conventional stereo processing may be incorrect. Thus, a novel method is required for improving the basic design architecture and enhancing the user experience.

SUMMARY

It is therefore an objective of the claimed invention to provide a method for performing multi-camera capturing control of an electronic device, and an associated apparatus, in order to solve the above-mentioned problems.

It is another objective of the claimed invention to provide a method for performing multi-camera capturing control of an electronic device, and an associated apparatus, in order to enhance the overall performance of the electronic device.

According to at least one preferred embodiment, a method for performing multi-camera capturing control of an electronic device is provided, where the method can be applied to the electronic device. The method may comprise the steps of: obtaining a plurality of preview images, wherein the plurality of preview images are generated by using at least one lens module of the electronic device; generating at least one distance-related index according to characteristics of the plurality of preview images; and according to the aforementioned at least one distance-related index, selectively controlling whether to allow multi-camera capturing or controlling whether to output warning information.

According to at least one preferred embodiment, an apparatus for performing multi-camera capturing control of an electronic device is also provided, where the apparatus may comprise at least one portion (e.g. a portion or all) of the electronic device. The apparatus comprises a control circuit and a calculation module. The control circuit is arranged for controlling operations of the electronic device. More particularly, under control of the control circuit, the electronic device obtains a plurality of preview images, wherein the plurality of preview images are generated by using at least one lens module of the electronic device. In addition, the calculation module is arranged for generating at least one distance-related index according to characteristics of the plurality of preview images. Additionally, according to the aforementioned at least one distance-related index, the control circuit selectively controls whether to allow multi-camera capturing or controls whether to output warning information.

According to at least one preferred embodiment, a method for performing multi-camera capturing control of an electronic device is also provided, where the method can be applied to the electronic device. The method may comprise the steps of: obtaining a specific preview image, wherein the specific preview image is generated by using a lens module of the electronic device; generating at least one distance-related index according to characteristics of the specific preview image; and according to the aforementioned at least one distance-related index, selectively controlling whether to allow multi-camera capturing or controlling whether to output warning information.

It is an advantage of the present invention that the present invention method and the associated apparatus can enhance the overall performance of the electronic device without introducing any side effect. In addition, in comparison with the related art, the present invention method and the associated apparatus can prevent the related art problems.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
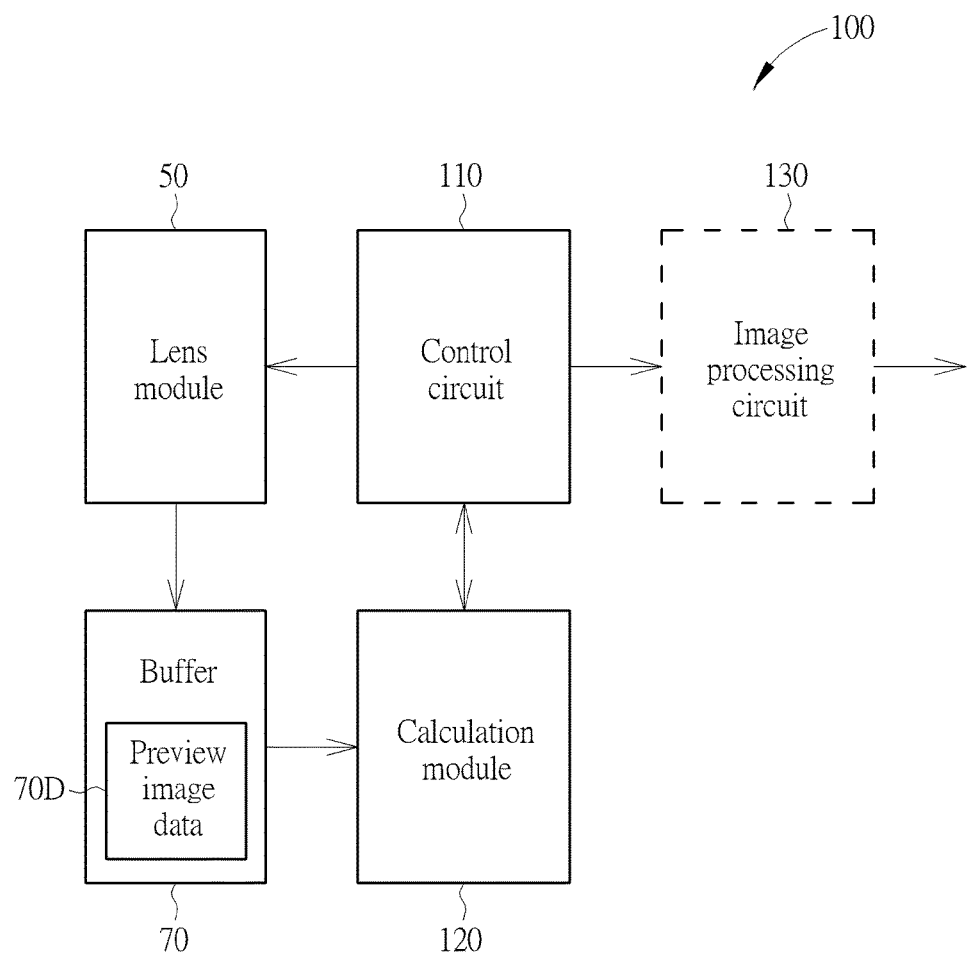
FIG. 1 is a diagram of an apparatus for performing multi-camera capturing control of an electronic device according to an embodiment of the present invention

FIG. 1 is a diagram of an apparatus 100 for performing multi-camera capturing control of an electronic device according to an embodiment of the present invention, where the apparatus 100 may comprise at least one portion (e.g. a portion or all) of the electronic device. For example, the apparatus 100 may comprise a portion of the electronic device, and more particularly, can be at least one hardware circuit such as at least one integrated circuit (IC) within the electronic device. In another example, the apparatus 100 can be the whole of the electronic device. In still another example, the apparatus 100 may comprise a system comprising the electronic device, such as an audio/video system comprising the electronic device. Examples of the electronic device may include, but not limited to, a mobile phone (e.g. a multifunctional mobile phone), a tablet, and a personal computer such as a laptop computer.

As shown in FIG. 1, the apparatus 100 may comprise a lens module 50, a buffer 70, a control circuit 110, and a calculation module 120. Please note that, in some embodiments, the apparatus 100 may further comprise an image processing circuit 130. For better comprehension, the image processing circuit 130 is illustrated in FIG. 1, where the block of the image processing circuit 130 can be illustrated with dashed lines to indicate that implementing the image processing circuit 130 within the apparatus 100 may be optional. The control circuit 110 is arranged for controlling operations of the electronic device. Under control of the control circuit 110, the electronic device may obtain a plurality of preview images, and may temporarily store the preview image data 70D of the plurality of preview images in the buffer 70, where the plurality of preview images can be generated by using at least one lens module (e.g. one or more lens modules) of the electronic device. In addition, the calculation module 120 is arranged for generating one or more indexes corresponding to the plurality of preview images. As a result, the control circuit 110 may selectively control some operations of the electronic device according to the aforementioned one or more indexes. For example, the control circuit 110 may selectively control whether to allow multi-camera capturing according to the aforementioned one or more indexes. In another example, the control circuit 110 may selectively control whether to output a notice (e.g., comprising warning information) according to the aforementioned one or more indexes. Additionally, the image processing circuit 130 may be arranged for performing image processing (e.g. multi-view image processing, such as stereo image processing).

In practice, the electronic device may comprise at least one processor (e.g. one or more processors) and associated hardware resources, and the aforementioned at least one processor may execute (or run) some program codes (e.g. program instructions), and a portion of components in the architecture shown in FIG. 1 can be implemented by the aforementioned at least one processor of the electronic device. Examples of the aforementioned at least one processor may include, but not limited to, a central processing unit (CPU) and a graphics processing unit (GPU). More particularly, the electronic device may further comprise a storage module (e.g. a hard disk drive (HDD), a non-volatile memory such as a Flash memory, or a dynamic random access memory (DRAM)) arranged to store information, data and/or program codes for the electronic device, and the aforementioned at least one processor may be arranged to control the operations of the electronic device according to the program codes (e.g. program instructions) loaded (or retrieved) from its internal storage or the storage module.

For example, in a situation where the electronic device comprises the CPU, the control circuit 110 may represent the CPU running an operating system (OS) and some drivers, and the calculation module 120 may represent the CPU running a software module that is capable of generating some indexes, for use of multi-camera capturing control. This is for illustrative purposes only, and is not meant to be a limitation of the present invention. In another example, in a situation where the electronic device comprises the CPU and the GPU, the control circuit 110 may represent the CPU running the OS and some drivers, and the calculation module 120 may represent the GPU running a software module that is capable of generating some indexes, for use of multi-camera capturing control.

Figure 2:
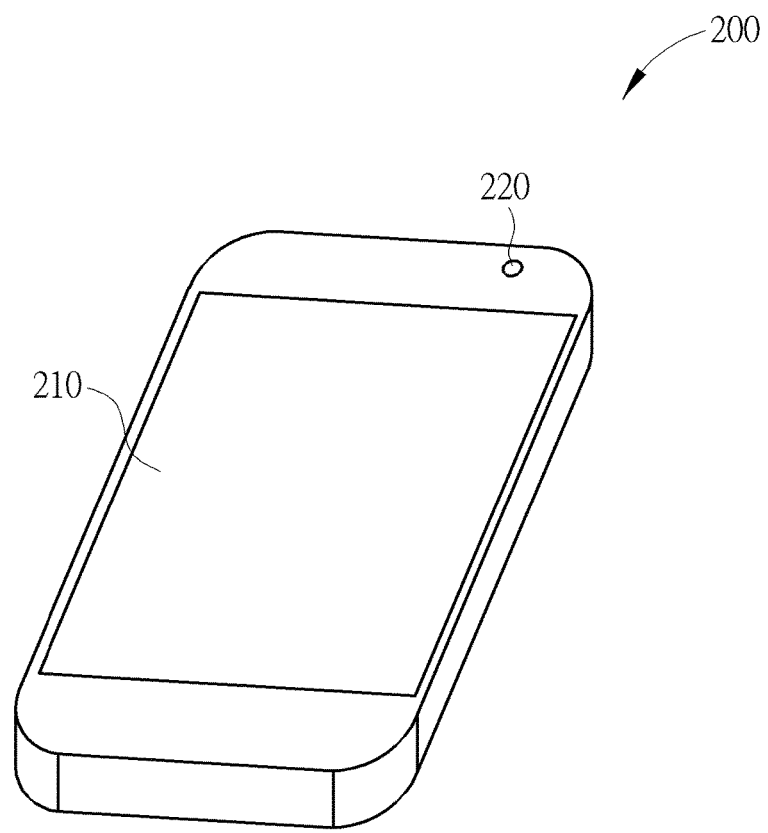
FIG. 2 illustrates a multifunctional mobile phone involved with the apparatus shown in FIG. 1 according to an embodiment of the present invention

FIG. 2 illustrates a multifunctional mobile phone 200 involved with the apparatus 100 shown in FIG. 1 according to an embodiment of the present invention, where the multifunctional mobile phone 200 can be taken as an example of the electronic device mentioned above. As shown in FIG. 2, the multifunctional mobile phone 200 may comprise a display module 210 and a lens module 220 such as a front camera. The display module 210 may be a touch sensitive display module. In some embodiments, the display module 210 may comprise a liquid crystal display (LCD) module (which can be referred to as LCM, for brevity) and a touch panel, where the LCD module may be arranged to display information for the multifunctional mobile phone 200, and the touch panel may be arranged to detect user inputs (e.g. user gesture inputs). This is for illustrative purposes only, and is not meant to be a limitation of the present invention.

Figure 3:
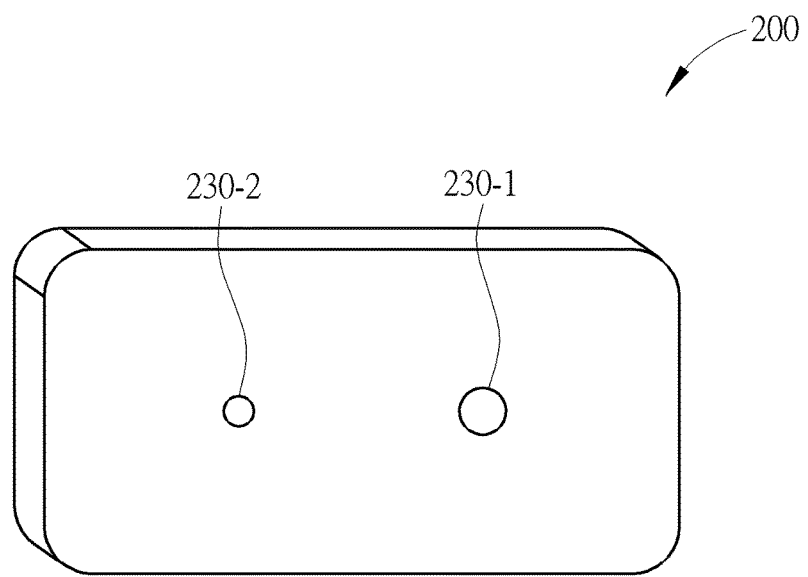
FIG. 3 illustrates some lens module of the multifunctional mobile phone shown in FIG. 2 according to an embodiment of the present invention, where these lens modules can be utilized for performing multi-camera capturing.

FIG. 3 illustrates some lens modules 230-1 and 230-2 of the multifunctional mobile phone 200 shown in FIG. 2 according to an embodiment of the present invention, where these lens modules 230-1 and 230-2 can be utilized for performing multi-camera capturing such as stereo capturing. In this embodiment, the number of lens modules for performing multi-camera capturing (e.g. these lens modules 230-1 and 230-2) can be equal to two. This is for illustrative purposes only, and is not meant to be a limitation of the present invention. In some embodiments, the number of lens modules for performing multi-camera capturing may vary. For example, the number of lens modules for performing multi-camera capturing can be more than two. In some examples, under control of the control circuit 110, the apparatus 100 may utilize only one lens module of the multifunctional mobile phone 200 (e.g. any of the lens modules 230-1 and 230-2) to capture images corresponding to different directions (or different positions) at different time point, respectively, to emulate the operation of capturing images through the lens modules 230-1 and 230-2.

Figure 4:
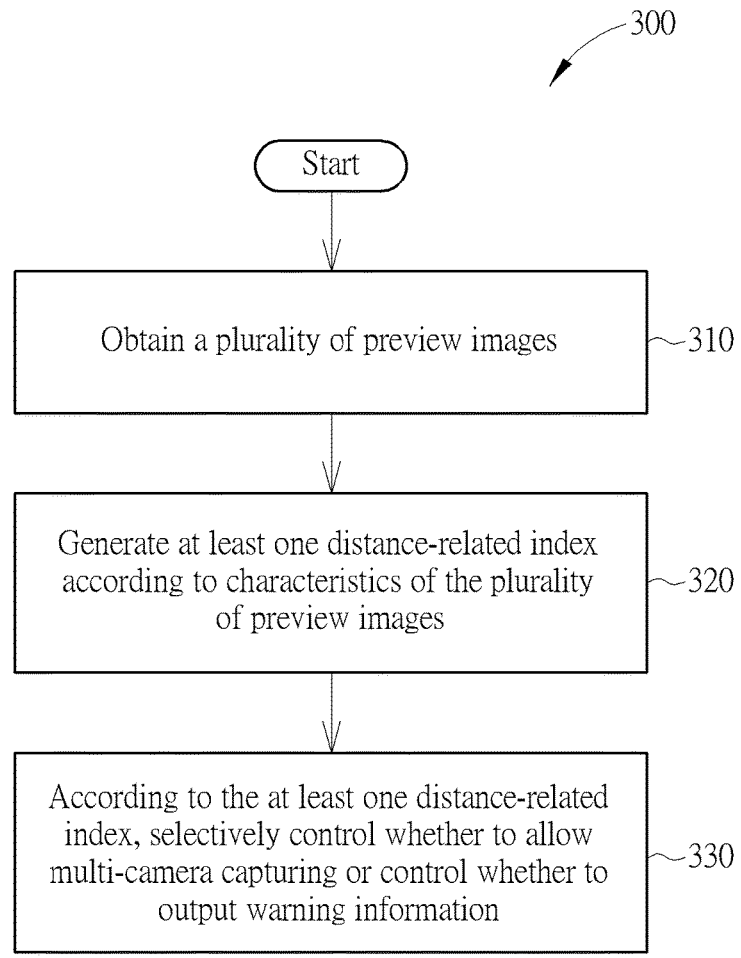
FIG. 4 illustrates a flowchart of a method for performing multi-camera capturing control of an electronic device according to an embodiment of the present invention.

FIG. 4 illustrates a flowchart of a method 300 for performing multi-camera capturing control of an electronic device according to an embodiment of the present invention. The method 300 shown in FIG. 4 can be applied to the apparatus 100 shown in FIG. 1 (more particularly, the multifunctional mobile phone 200 of the embodiment shown in FIG. 2), and can be applied to the control circuit 110 thereof (more particularly, the aforementioned at least one processor executing the program codes). For example, the program codes may be provided through a computer program product having program instructions (such as those mentioned above) for instructing the aforementioned at least one processor to perform the method 300 shown in FIG. 3, where the computer program product may be implemented as a non-transitory computer-readable medium (e.g. a floppy disk or a compact disc-read only memory (CD-ROM)) storing the program instructions or an equivalent version thereof, such as a software package for being installed. This is for illustrative purposes only, and is not meant to be a limitation of the present invention. The method can be described as follows.

In Step 310, the control circuit 110 controls the electronic device to obtain a plurality of preview images (e.g. the plurality of preview images mentioned in the embodiment shown FIG. 1, such as those represented by the preview image data 70D), where the plurality of preview images can be generated by using at least one lens module (e.g. one or more lens modules) of the electronic device, such as the lens modules 230-1 and 230-2 in the embodiment shown in FIG. 3. This is for illustrative purposes only, and is not meant to be a limitation of the present invention. In some embodiments, the number of lens modules for obtaining the plurality of preview images may vary. For example, under control of the control circuit 110, the apparatus 100 may utilize more than two lens modules to obtain the plurality of preview images. In some examples, under control of the control circuit 110, the apparatus 100 may utilize only one lens module (e.g. any of the lens modules 230-1 and 230-2) to obtain the plurality of preview images.

In Step 320, the calculation module 120 generates at least one distance-related index (e.g. one or more distance-related indexes) according to characteristics of the plurality of preview images mentioned in Step 310. In practice, the aforementioned at least one distance-related index may comprise at least one or a combination of a distance index, a disparity index, and a depth index (e.g. the distance index, the disparity index, and/or the depth index). For example, the aforementioned at least one distance-related index may be one of the distance index, the disparity index, and the depth index. In another example, the aforementioned at least one distance-related index may be a combination of the distance index, the disparity index, and the depth index, such as the combination of two or more indexes within the distance index, the disparity index, and the depth index.

In Step 330, according to the aforementioned at least one distance-related index, the control circuit 110 selectively controls whether to allow multi-camera capturing or controls whether to output warning information such as that mentioned above. For example, the control circuit 110 may selectively control whether to allow multi-camera capturing according to the aforementioned at least one distance-related index. In another example, the control circuit 110 may selectively control whether to output the warning information according to the aforementioned at least one distance-related index. In a situation where the number of lens modules for obtaining the plurality of preview images mentioned in Step 310 is equal to two, the multi-camera capturing mentioned in Step 330 can be stereo capturing. This is for illustrative purposes only, and is not meant to be a limitation of the present invention.

For example, the aforementioned at least one lens module may comprise multiple lens modules of the electronic device, such as the lens modules 230-1 and 230-2 of the embodiment shown in FIG. 3. More particularly, a stereo camera of the electronic device may comprise the multiple lens modules of the electronic device, where the apparatus 100 may comprise this stereo camera. This is for illustrative purposes only, and is not meant to be a limitation of the present invention. According to some embodiments of the present invention, the aforementioned at least one lens module may comprise a single lens module of the electronic device, and any two preview images within the plurality of preview images may be generated by using the single lens module at different time points, respectively.

According to some embodiments of the present invention, the aforementioned at least one distance-related index may correspond to a specific region of at least one preview image within the plurality of preview images. For example, the specific region of the aforementioned at least one preview image may comprise the whole region of the aforementioned at least one preview image, and more particularly, the whole image of each preview image within the aforementioned at least one preview image. This is for illustrative purposes only, and is not meant to be a limitation of the present invention. In some examples, the specific region of the aforementioned at least one preview image may comprise a region of interest (ROI) within the aforementioned at least one preview image. Examples of the ROI may include, but not limited to, the center of one or both of a left image and a right image (e.g. the center of any of a left image and a right image of a set of stereo images), a high texture region, a saliency region, a human face region, and a user touch-focus region.

According to some embodiments of the present invention, when a preview object is human (e.g. the plurality of preview images may include human faces), the control circuit 110 may perform face detection operations on one of the plurality of preview images. For example, the control circuit 110 may use the size of the face to determine the aforementioned at least one distance-related index. In another example, the control circuit 110 may use both the size of the face and the age of the face (e.g. the age of person having the face, such as an estimated age determined through face classification) to determine the aforementioned at least one distance-related index. In another example, the control circuit 110 may calculate the aforementioned at least one distance-related index for the human face region (or a nearby region including the human face region) which is found from one or more other input images, to determine the aforementioned at least one distance-related index. This is for illustrative purposes only, and is not meant to be a limitation of the present invention.

According to some embodiments of the present invention, when the preview object is human (e.g. the plurality of preview images may include human faces), the control circuit 110 may perform face detection operations on two or more of the plurality of preview images. For example, the control circuit 110 may detect each preview image of the two or more of the plurality of preview images independently. In another example, the control circuit 110 may predict the face size and/or the face position from a found face in other images within the plurality of preview images, in order to utilize the face size (or the derivative thereof) and/or the face position (or the derivative thereof) as the aforementioned at least one distance-related index, where the aforementioned at least one distance-related index may be defined or calibrated with respect to the real distance between the face and the electronic device in advance. In another example, the control circuit 110 may detect and use one or more faces in each preview image of the two or more of the plurality of preview images, and more particularly, the face of the maximal size within the one or more faces. In some examples, the control circuit 110 may use the face position and/or the face size of two (or more) faces from two (or more) different images within the two or more of the plurality of preview images, to determine the aforementioned at least one distance-related index. In some examples, the control circuit 110 may calculate the aforementioned at least one distance-related index based on the ROI such as the human face region (or the nearby region including the human face region) which is found from the two or more of the plurality of preview images, to determine the aforementioned at least one distance-related index.

According to some embodiments of the present invention, the control circuit 110 may obtain a specific preview image, where the specific preview image is generated by using a lens module of the electronic device, such as any of the lens modules 230-1 and 230-2. In addition, in these embodiments, the calculation module 120 may generate the aforementioned at least one distance-related index according to characteristics of the specific preview image, rather than the characteristics of the plurality of preview images mentioned in Step 310. Additionally, according to the aforementioned at least one distance-related index that is generated according to the characteristics of the specific preview image in these embodiments, the control circuit 110 selectively controls whether to allow multi-camera capturing or controls whether to output the warning information. For example, the control circuit 110 may perform face detection on the specific preview image to determine a specific face image in the specific preview image, and determine a certain distance-related index within the at least one distance-related index of these embodiments according to at least one face parameter of the specific face image and according to a set of predetermined reference data regarding faces, where the certain distance-related index may correspond to the specific preview image. In practice, the aforementioned at least one face parameter of the specific face image may comprise the face size of the specific face image and/or the face position of the specific face image.

According to some embodiments of the present invention, the control circuit 110 may obtain a preview image such as the specific preview image generated by using the lens module of the electronic device (e.g. any of the lens modules 230-1 and 230-2). In addition, in these embodiments, the calculation module 120 may generate the aforementioned at least one distance-related index according to infrared (IR)-based distance derivation, and, preferably, further according to characteristics of this preview image, rather than the characteristics of the plurality of preview images mentioned in Step 310. For example, the apparatus 100 may comprise at least one IR detector (e.g. one or more IR detectors) arranged for performing IR detection to generate a plurality of IR detection results, and the calculation module 120 may calculate the IR-based distance derivation according to the plurality of IR detection results. Additionally, according to the aforementioned at least one distance-related index that is generated according to the IR-based distance derivation in these embodiments, the control circuit 110 selectively controls whether to allow multi-camera capturing or controls whether to output the warning information. For example, the control circuit 110 may perform face detection on this preview image to determine a face image in this preview image, and determine a distance-related index within the at least one distance-related index of these embodiments according to at least one face parameter of this face image and according to a set of predetermined reference data regarding faces, where this distance-related index within the at least one distance-related index may correspond to this preview image. In practice, the aforementioned at least one face parameter of this face image may comprise the face size of this face image and/or the face position of this face image. This is for illustrative purposes only, and is not meant to be a limitation of the present invention. According to some embodiments of the present invention, the calculation module 120 may generate the aforementioned at least one distance-related index according to phase detection results. For example, the apparatus 100 may comprise at least one phase-detection autofocus (PDAF) sensor (e.g. one or more PDAF sensors) arranged for performing phase detection to generate a plurality of phase detection results, and the calculation module 120 may generate the aforementioned at least one distance-related index according to according to the plurality of phase detection results. In one or more of these embodiments, the aforementioned at least one PDAF sensor may be integrated into the image sensor within the lens module 50. That is, the lens module 50 includes both image pixels and PDAF pixels.

According to some embodiments of the present invention, in a situation where the aforementioned at least one distance-related index comprises at least one or a combination of the distance index, the disparity index, and the depth index (e.g. the distance index, the disparity index, and/or the depth index), the aforementioned at least one distance-related index may correspond to the specific region of the aforementioned at least one preview image within the plurality of preview images. For example, according to a portion of these embodiments, in Step 320, the calculation module 120 may be arranged for obtaining a plurality of disparity values corresponding to the specific region from a disparity map, selecting a representative disparity value of the plurality of disparity values, and utilizing the representative disparity value as the disparity index. In one embodiment, the representative disparity value may be the maximum disparity value (or the $n^{th}$ maximum disparity value, where the notation n may represent a positive integer) from the plurality of disparity values. Alternatively, the representative disparity value may be a statistic value of the plurality of disparity values. In one embodiment, in order to prevent the following operation from being influenced by noise, the calculation module 120 may determine whether the number of preliminary qualified pixels within the specific region is greater than a given threshold, wherein the preliminary qualified pixels mean the pixels having the disparity value greater than a preliminary disparity threshold. If the number of preliminary qualified pixels within the specific region is greater than the given threshold, the calculation module 120 would determine the representative disparity value according to all of the disparity values corresponding to the specific region. In another example, after the removal of the extreme data among all of the disparity values within the specific region, the calculation module 120 would determine the representative disparity value according to the remaining disparity values.

As a result of at least one comparison operation regarding the disparity index, in Step 330, the control circuit 110 may determine whether the apparatus 100 should allow multi-camera capturing or should output the warning information (e.g. display the warning information on the screen of the electronic device, such as the display module 210 of the multifunctional mobile phone 200, and preferably, prohibit a multi-camera capturing function of the electronic device from being triggered). For example, in order to prevent the multifunctional mobile phone 200 from being too close to an object, when the disparity index is less than (or is less than or equal to) a predetermined disparity threshold DPTH_1, the control circuit 110 may control the apparatus 100 to allow multi-camera capturing; otherwise, the control circuit 110 may control the apparatus 100 to output the warning information. In another example, in order to prevent the multifunctional mobile phone 200 from being too far from this object, when the disparity index is greater than (or is greater than or equal to) a predetermined disparity threshold DPTH_2, the control circuit 110 may control the apparatus 100 to allow multi-camera capturing; otherwise, the control circuit 110 may control the apparatus 100 to output the warning information. In another example, when the disparity index is less than (or is less than or equal to) the predetermined disparity threshold DPTH_1 and is greater than (or is greater than or equal to) the predetermined disparity threshold DPTH_2 (which may be less than the predetermined disparity threshold DPTH_1 in this example), the control circuit 110 may control the apparatus 100 to allow multi-camera capturing; otherwise, the control circuit 110 may control the apparatus 100 to output the warning information.

According to another portion of these embodiments, in Step 320, the calculation module 120 may be arranged for obtaining a plurality of depth values corresponding to the specific region from a depth map, selecting a representative depth value of the plurality of depth values, and utilizing the representative depth value as the depth index. In one embodiment, the representative depth value may be the minimum depth value (or the $m^{th}$ minimum depth value, where the notation m may represent a positive integer) from the plurality of depth values. Alternatively, the representative depth value may be a statistic value of the plurality of depth values. In one embodiment, in order to prevent the following operation from being influenced by noise, the calculation module 120 may determine whether the number of preliminary qualified pixels within the specific region is greater than a given threshold, wherein the preliminary qualified pixels mean the pixels having the depth value smaller than a preliminary depth threshold. If the number of preliminary qualified pixels within the specific region is greater than the given threshold, the calculation module 120 would determine the representative depth value according to all of the depth values corresponding to the specific region. In another example, after the removal of the extreme data among all of the depth values within the specific region, the calculation module 120 would determine the representative depth value according to the remaining depth values.

As a result of at least one comparison operation regarding the depth index, in Step 330, the control circuit 110 may determine whether the apparatus 100 should allow multi-camera capturing or should output the warning information (e.g. display the warning information on the screen of the electronic device, such as the display module 210 of the multifunctional mobile phone 200, and preferably, prohibit the multi-camera capturing function of the electronic device from being triggered). For example, in order to prevent the multifunctional mobile phone 200 from being too far from an object, when the depth index is less than (or is less than or equal to) a predetermined depth threshold DETH_1, the control circuit 110 may control the apparatus 100 to allow multi-camera capturing; otherwise, the control circuit 110 may control the apparatus 100 to output the warning information. In another example, in order to prevent the multifunctional mobile phone 200 from being too close to this object, when the depth index is greater than (or is greater than or equal to) a predetermined depth threshold DETH_2, the control circuit 110 may control the apparatus 100 to allow multi-camera capturing; otherwise, the control circuit 110 may control the apparatus 100 to output the warning information. In another example, when the depth index is less than (or is less than or equal to) the predetermined depth threshold DETH_1 and is greater than (or is greater than or equal to) the predetermined depth threshold DETH_2 (which may be less than the predetermined depth threshold DETH_1 in this example), the control circuit 110 may control the apparatus 100 to allow multi-camera capturing; otherwise, the control circuit 110 may control the apparatus 100 to output the warning information.

According to some embodiments of the present invention, in Step 320, the calculation module 120 may perform face detection on the plurality of preview images to generate the aforementioned at least one distance-related index. For example, in Step 320, the calculation module 120 may perform the face detection on a specific preview image within the plurality of preview images to determine a specific face image in this specific preview image, and may further determine a specific distance-related index within the aforementioned at least one distance-related index according to at least one face parameter of the specific face image, where the specific distance-related index may correspond to this specific preview image, and the aforementioned at least one face parameter of the specific face image may comprise the face size of the specific face image and/or the face position of the specific face image.

According to some embodiments of the present invention, in Step 330, when it is detected that a specific distance-related index within the aforementioned at least one distance-related index falls within a predetermined range, the control circuit 110 may output a notification (e.g., a voice notification or a visual notification) which indicates that the multi-camera capturing function of the electronic device is allowed to be triggered, where the multi-camera capturing function can be utilized for capturing multiple images through multiple camera of the electronic device, such as the lens modules 230-1 and 230-2 of the embodiment shown in FIG. 3. This is for illustrative purposes only, and is not meant to be a limitation of the present invention. According to some embodiments of the present invention, in Step 330, when it is detected that the specific distance-related index within the aforementioned at least one distance-related index falls within the predetermined range, the control circuit 110 may allow the multi-camera capturing function of the electronic device to be triggered, and may perform the multi-camera capturing function to capture multiple images in response to a user input. More particularly, after performing the multi-camera capturing function to capture the multiple images in response to the user input, the control circuit 110 may further perform a multi-view image processing based on the multiple images.

During the multi-view image processing, for example, the image processing circuit 130 may perform one or more refocusing operations, in order to simulate one or more better focus results of the captured images. This is for illustrative purposes only, and is not meant to be a limitation of the present invention. In another example, during the multi-view image processing, the image processing circuit 130 may perform one or more stereo-based segmentation operations, in order to apply different colors (or different special effects) to the foreground and the background, respectively. In another example, during the multi-view image processing, the image processing circuit 130 may perform one or more stereo-based segmentation operations, in order to keep the foreground object(s) and replace the background by something else. In another example, during the multi-view image processing, the image processing circuit 130 may perform one or more stereo-based segmentation operations, in order to keep the foreground object(s) and apply at least one special effect (e.g. one or more special effects) to the background, where examples of the aforementioned at least one special effect may include, but not limited to, converting into one or more gray level images, blurring, converting into one or more oil painting images. In another example, during the multi-view image processing, the image processing circuit 130 may perform one or more stereo-based segmentation operations, in order to generate a series of pseudo 3D images respectively corresponding to different viewing directions by changing the respective position of the foreground object(s) with respect to the background. As a result, the image processing circuit 130 allows the user to view the series of pseudo 3D images respectively corresponding to different viewing directions, one by one, as if he/she see the foreground object(s) in the real space.

According to some embodiments of the present invention, in Step 330, when it is detected that the specific distance-related index within the aforementioned at least one distance-related index falls within the predetermined range, the control circuit 110 may allow the multi-camera capturing function of the electronic device to be triggered; otherwise, the control circuit 110 may prohibit the multi-camera capturing function of the electronic device from being triggered. This is for illustrative purposes only, and is not meant to be a limitation of the present invention. According to some embodiments of the present invention, in Step 330, when it is detected that each of the aforementioned at least one distance-related index does not fall within the predetermined range, the control circuit 110 may lock at least one user interface (UI) used for triggering the multi-camera capturing function of the electronic device. More particularly, the aforementioned at least one UI may comprise at least one physical button of the electronic device and/or at least one virtual button on a touch sensitive display module of the electronic device (e.g. the touch sensitive display module mentioned in the embodiment shown in FIG. 2). According to some embodiments of the present invention, in Step 330, when it is detected that each of the aforementioned at least one distance-related index does not fall within the predetermined range, the control circuit 110 may output the warning information. According to some embodiments of the present invention, in Step 330, when it is detected that the specific distance-related index within the aforementioned at least one distance-related index falls within the predetermined range, the control circuit 110 may automatically perform the multi-camera capturing function to capture multiple images.

Figure 5:
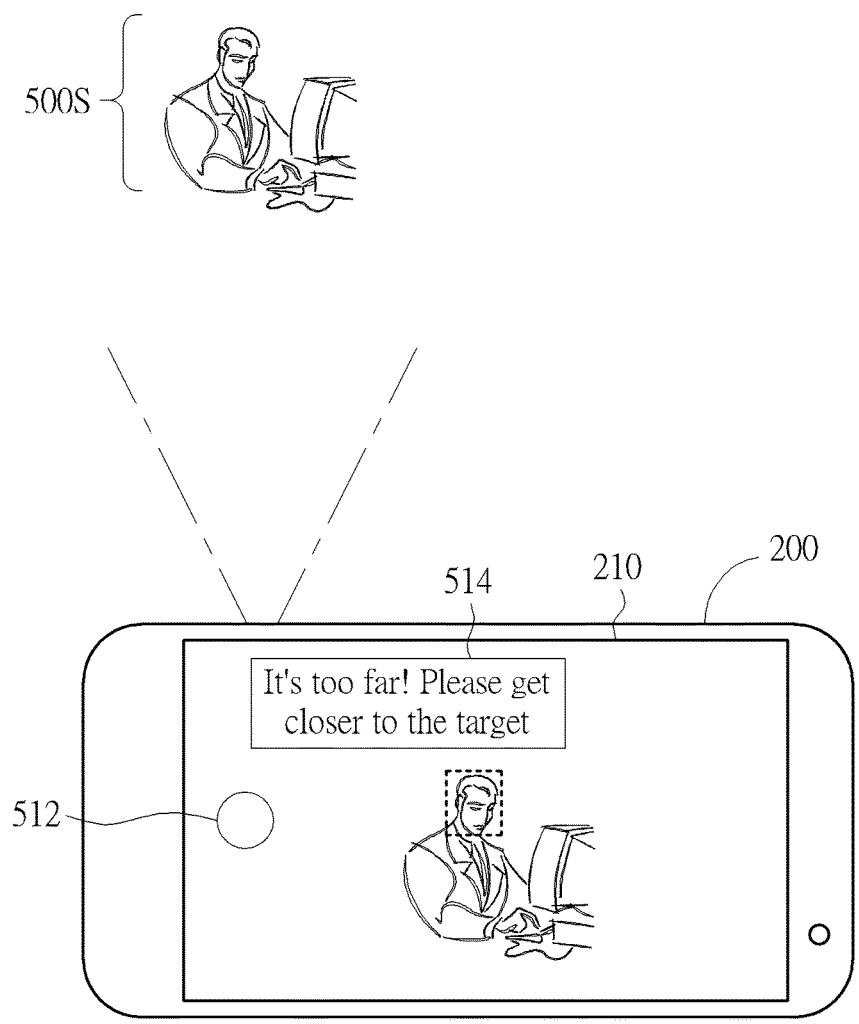
FIG. 5 illustrates a control scheme involved with the method shown in FIG. 4 according to an embodiment of the present invention.

FIG. 5 illustrates a control scheme involved with the method 300 shown in FIG. 4 according to an embodiment of the present invention. For example, in the scene 500S in front of the user of the multifunctional mobile phone 200, a person is working hard in the office. According to this embodiment, in Step 330, when it is detected that the specific distance-related index within the aforementioned at least one distance-related index falls within the predetermined range, the control circuit 110 may allow the multi-camera capturing function of the electronic device to be triggered; otherwise, the control circuit 110 may prohibit the multi-camera capturing function of the electronic device from being triggered.

Under control of the control circuit 110, the apparatus 100 may detect the aforementioned at least one distance-related index (e.g. the distance index, the disparity index, and/or the depth index), and show a notice 514 such as the text string "It's too far! Please get closer to the target" when the aforementioned at least one distance-related index indicates that the distance between the multifunctional mobile phone 200 and the person in the scene 500S is not in a proper range, where the notice 514 can be taken as an example of the warning information mentioned in Step 330. In addition, as the aforementioned at least one distance-related index indicates that the distance between the multifunctional mobile phone 200 and the person in the scene 500S is not in the proper range, the control circuit 110 may disable the capture button in the UI of this embodiment, such as a virtual button 512 on the display module 210 shown in FIG. 5 (more particularly, the touch sensitive display module of the electronic device). In practice, under control of the control circuit 110, the apparatus 100 may illustrate the virtual button 512 with a predetermined color to indicate that the virtual button 512 is disabled. For brevity, similar descriptions for this embodiment are not repeated in detail here.

Figure 6:
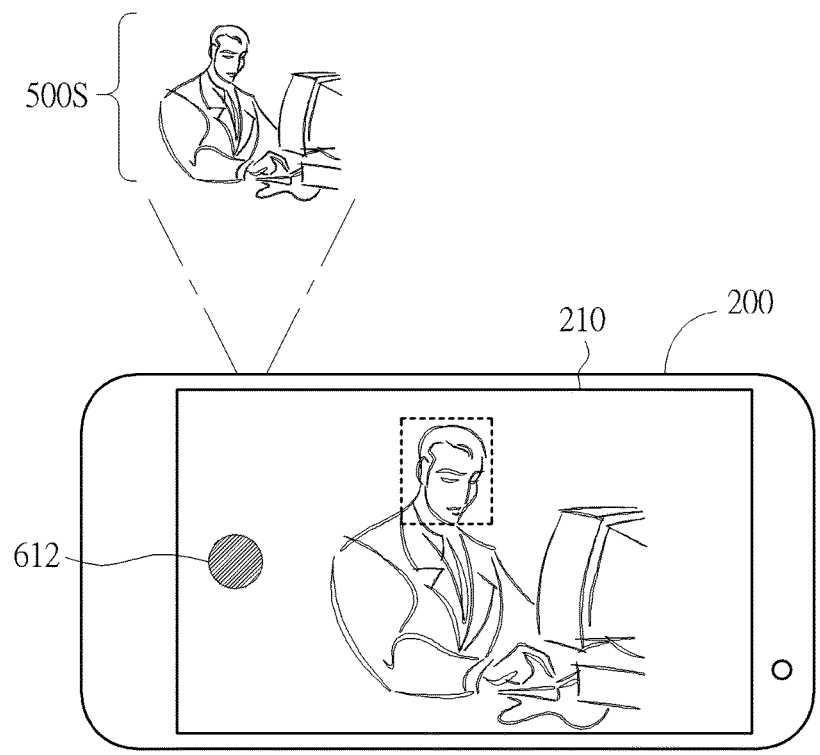
FIG. 6 illustrates a control scheme involved with the method shown in FIG. 4 according to another embodiment of the present invention.

FIG. 6 illustrates a control scheme involved with the method 300 shown in FIG. 4 according to another embodiment of the present invention. For example, in the scene 500S in front of the user of the multifunctional mobile phone 200, the same person as that of the embodiment shown in FIG. 5 is still working hard in the office, where the user may have moved to be closer to the person in the scene 500S. According to this embodiment, in Step 330, when it is detected that the specific distance-related index within the aforementioned at least one distance-related index falls within the predetermined range, the control circuit 110 may allow the multi-camera capturing function of the electronic device to be triggered; otherwise, the control circuit 110 may prohibit the multi-camera capturing function of the electronic device from being triggered.

Under control of the control circuit 110, the apparatus 100 may detect the aforementioned at least one distance-related index (e.g. the distance index, the disparity index, and/or the depth index), and remove the notice 514 such as the text string "It's too far! Please get closer to the target" shown in FIG. 5 when the aforementioned at least one distance-related index indicates that the distance between the multifunctional mobile phone 200 and the person in the scene 500S is in the proper range. This is for illustrative purposes only, and is not meant to be a limitation of the present invention. According to some embodiments of the present invention, when the aforementioned at least one distance-related index indicates that the distance between the multifunctional mobile phone 200 and the person in the scene 500S is in the proper range, the control circuit 110 may replace the warning information mentioned in Step 330 (e.g. the notice 514 shown in FIG. 5) by confirmation information such as a text string "It's OK" (not shown), etc.

In addition, as the aforementioned at least one distance-related index indicates that the distance between the multi-functional mobile phone 200 and the person in the scene 500S is in the proper range, the control circuit 110 may enable the aforementioned capture button in the UI of the embodiment shown in FIG. 5, such as a virtual button 612 on the display module 210 shown in FIG. 6 (more particularly, the touch sensitive display module of the electronic device), and may illustrate the virtual button 612 with another predetermined color to indicate that the virtual button 612 is enabled. For brevity, similar descriptions for this embodiment are not repeated in detail here.

Figure 7:
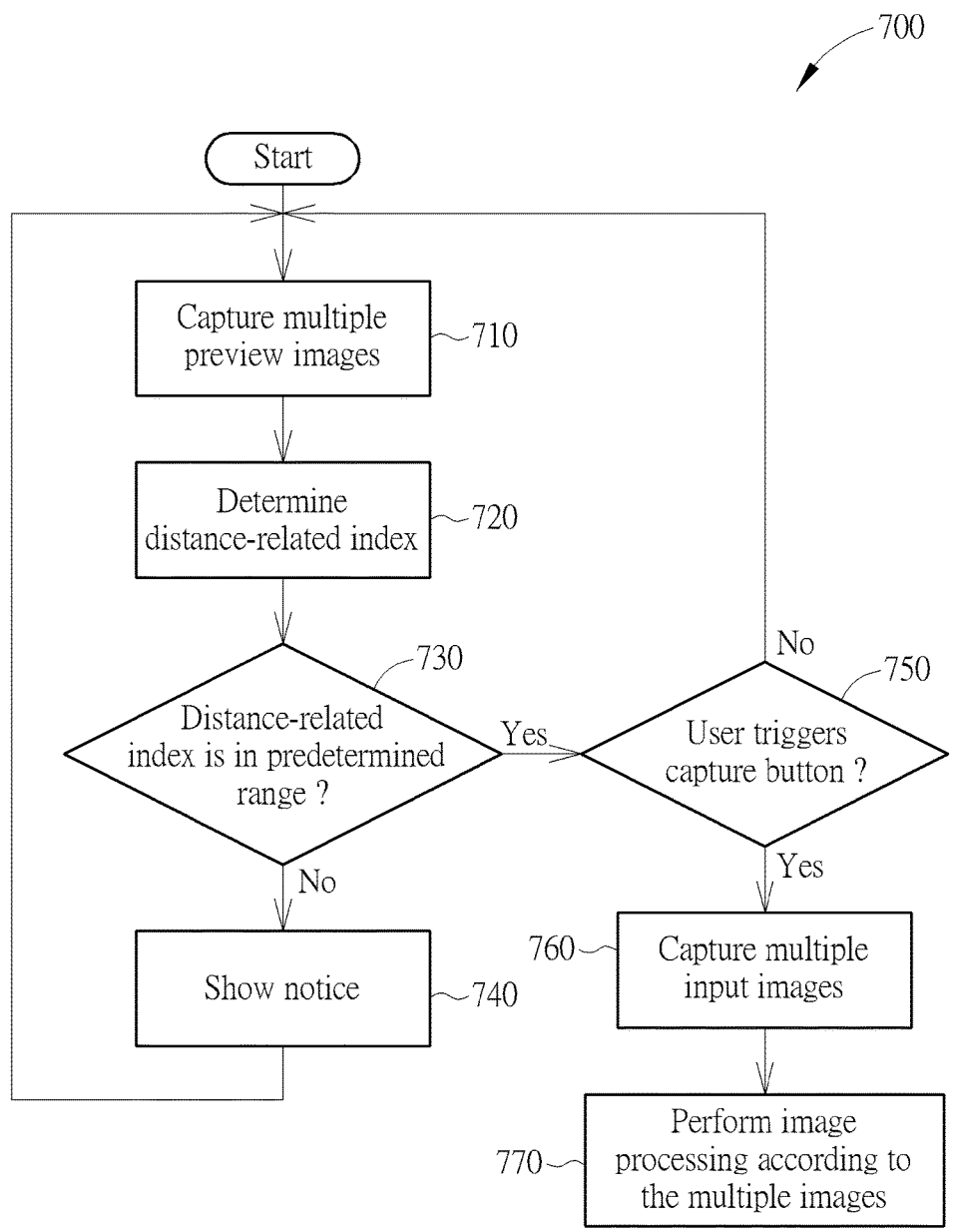
FIG. 7 illustrates a working flow involved with the method shown in FIG. 4 according to an embodiment of the present invention.

FIG. 7 illustrates a working flow 700 involved with the method 300 shown in FIG. 4 according to an embodiment of the present invention.

In Step 710, the control circuit 110 controls the electronic device to capture multiple preview images such as the plurality of preview images mentioned in Step 310. For example, the multiple preview images can be stereo images obtained from the stereo camera mentioned in the embodiment shown in FIG. 4. This is for illustrative purposes only, and is not meant to be a limitation of the present invention. According to some embodiments of the present invention, the multiple preview images can be multiple images obtained from multiple cameras, which can be taken as an example of the multiple lens modules mentioned in the embodiment shown in FIG. 4, where it is unnecessary that the multiple lens modules are implemented as components of the stereo camera. According to some embodiments of the present invention, the multiple preview images can be two or more images obtained from a single camera (which can be taken as an example of the aforementioned single lens module) at different time points. In practice, the two or more images may correspond to different camera positions of this single camera, respectively, where the user needs to move the camera to capture the two or more images. In addition, the two or more images may correspond to different camera settings, such as different 3A (e.g. auto white balance, auto focus, auto exposure) settings, respectively. More particularly, the apparatus 100 may control this single camera to capture the two or more images by using difference focus control parameters of this single camera, respectively. According to some embodiments of the present invention, as the apparatus 100 may control this single camera to capture multiple images during an auto-focus procedure, the control circuit 110 may determine which of these images corresponds to the best focusing result (e.g. determine the image that is clearest within these images), and therefore may determine the focus control parameter corresponding of this image (e.g. the focus control parameter that is utilized for capturing the clearest image). As a result, the control circuit 110 may determine an estimated distance of an object (i.e. the estimated distance between the object and this single camera) according to an equation and/or a look up table (LUT), where this equation and/or this LUT may indicate a predetermined relationship between the focus control parameters and the estimated distances of objects.

In Step 720, the control circuit 110 utilizes the calculation module 120 to determine a distance-related index, such as the specific distance-related index within the aforementioned at least one distance-related index mentioned in Step 320, where this distance-related index may correspond to the distance of a preview object in the multiple preview images that are just obtained in Step 710. For example, the calculation module 120 may generate this distance-related index according to characteristics of the multiple preview images that are just obtained in Step 710.

In Step 730, the control circuit 110 checks whether the distance-related index (more particularly, the distance-related index that is just determined in Step 720) is in a predetermined range such as that mentioned in some embodiments described between the embodiment shown in FIG. 4 and the embodiment shown in FIG. 5. When it is detected that the distance-related index is in the predetermined range, Step 750 is entered; otherwise, Step 740 is entered.

In Step 740, the control circuit 110 controls the electronic device to show a notice. For example, the notice mentioned in Step 740 can be the same as the notice 514 of the embodiment shown in FIG. 5. In practice, the control circuit 110 may disable (or keep disabling) the capture button when Step 740 is entered or re-entered. After the operation of Step 740 is performed, Step 710 is re-entered.

Please note that, in this embodiment, the notice mentioned in Step 740 can be the same as the notice 514 shown in FIG. 5. This is for illustrative purposes only, and is not meant to be a limitation of the present invention. According to some embodiments of the present invention, the implementation of the notice mentioned in Step 740 may vary. Examples of this notice may include, but not limited to, text strings, graphics, icons, audio hints.

In Step 750, the control circuit 110 checks whether the user triggers the capture button of the electronic device, such as the virtual button 612 on the display module 210 shown in FIG. 6 (more particularly, the touch sensitive display module of the electronic device). In practice, the control circuit 110 may enable (or keep enabling) the capture button when Step 750 is entered or re-entered. When it is detected that the user triggers the capture button, Step 760 is entered; otherwise, Step 710 is re-entered.

In Step 760, upon trigger of the user, the control circuit 110 controls the electronic device to capture multiple input images, which are different from the multiple preview images mentioned in Step 710 of this embodiment. For example, the user may trigger the aforementioned multi-camera capturing function by touching (or pressing) the capture button. As a result, the control circuit 110 may control the electronic device to capture the multiple input images immediately.

In Step 770, the image processing circuit 130 performs image processing (e.g. the multi-view image processing mentioned in some embodiments described between the embodiment shown in FIG. 4 and the embodiment shown in FIG. 5) according to the multiple images captured by using the multi-camera capturing function mentioned above, such as the multiple input images captured in Step 760. This is for illustrative purposes only, and is not meant to be a limitation of the present invention. According to some embodiments of the present invention, the operation of Step 760 may be skipped (or omitted). More particularly, under control of the control circuit 110, the apparatus 100 may use the multiple preview images captured in Step 710 during the image processing mentioned in Step 770 in these embodiments.

During the image processing mentioned in Step 770, the image processing circuit 130 may calculate disparity values or depth values according to the multiple input images captured in Step 760, and may perform various kinds of applications based on the calculated disparity values or the calculated depth values. For example, the image processing circuit 130 may perform image refocusing operations. In another example, the image processing circuit 130 may perform 3D shaping operations, in order to construct 3D shape according to the calculated disparity values or the calculated depth values.

Please note that, in the embodiment shown in FIG. 7, the control circuit 110 may enable (or keep enabling) the capture button when Step 750 is entered or re-entered, and therefore may allow the user to trigger the aforementioned multi-camera capturing function by touching (or pressing) the capture button. This is for illustrative purposes only, and is not meant to be a limitation of the present invention. According to some embodiments of the present invention (e.g. the embodiment shown in FIG. 8), the implementation of triggering the multi-camera capturing function may vary. For example, the operation of checking whether the user triggers the capture button may be replaced by an automatic operation.

Figure 8:
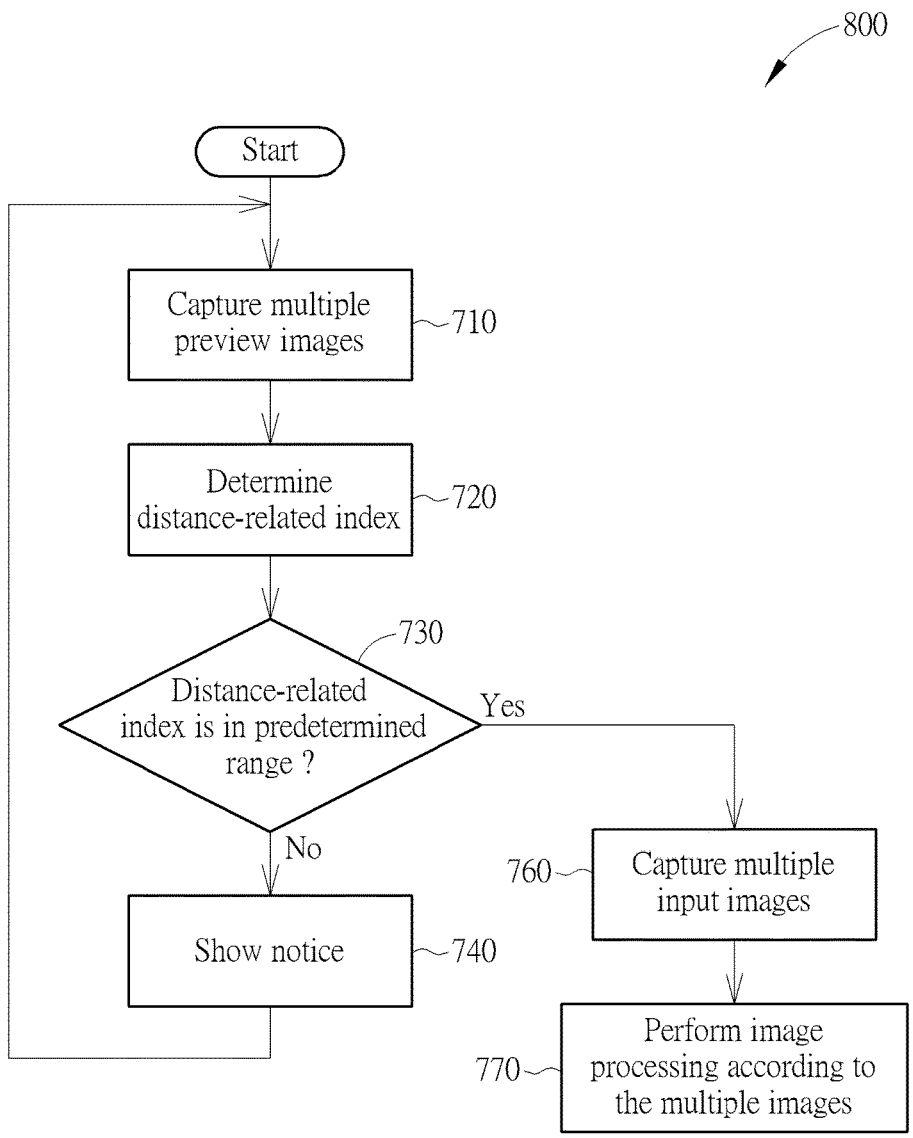
FIG. 8 illustrates a working flow involved with the method shown in FIG. 4 according to another embodiment of the present invention.

FIG. 8 illustrates a working flow 800 involved with the method 300 shown in FIG. 4 according to another embodiment of the present invention. Please note that Step 750 of the working flow 700 shown in FIG. 7 can be skipped (or omitted) in this embodiment. More particularly, in the working flow 800 shown in FIG. 8, in Step 730, when it is detected that the distance-related index is in the predetermined range, Step 760 is entered; otherwise, Step 740 is entered. As a result, under control of the control circuit 110, the operation of Step 760 may be automatically performed, having no need to be triggered by a user input. For brevity, similar descriptions for this embodiment are not repeated in detail here.

Some implementation details regarding the distance index, the disparity index, and the depth index mentioned above are further described as follows. According to some embodiments of the present invention, under control of the control circuit 110, the apparatus 100 may detect a distance DIST between an object in the scene within the real space (e.g. the scene 500S) and the electronic device, and utilize the distance DIST as the distance index. This is for illustrative purposes only, and is not meant to be a limitation of the present invention. According to some embodiments of the present invention, under control of the control circuit 110, the apparatus 100 may utilize a derivative of the distance DIST as the distance index.

According to some embodiments of the present invention, under control of the control circuit 110, the apparatus 100 may utilize a depth Z as the depth index, where the depth Z may be obtained from a depth image (which can be taken as an example of the depth map mentioned above), such as an image that represents the depths of all pixels within a frame. In practice, the depths of the pixels may be quantized to 8 bits, for example, and the quantized results may be stored in the depth image for all of the pixels. This is for illustrative purposes only, and is not meant to be a limitation of the present invention. According to some embodiments of the present invention, the number of bits of each of the quantized results may vary. According to some embodiments of the present invention, under control of the control circuit 110, the apparatus 100 may utilize a derivative of the depth Z as the depth index.

According to some embodiments of the present invention, under control of the control circuit 110, the apparatus 100 may utilize a disparity DISP as the disparity index, where the disparity DISP may be obtained from a disparity image (which can be taken as an example of disparity map mentioned above), such as an image that stores the disparity values of all pixels within a frame. This is for illustrative purposes only, and is not meant to be a limitation of the present invention. According to some embodiments of the present invention, under control of the control circuit 110, the apparatus 100 may utilize a derivative of the disparity DISP as the disparity index.

Regarding the disparity DISP and the depth Z, the calculation module 120 may perform conversion operations according to a predetermined relationship between the disparity DISP and the depth Z, in order to obtain one of the disparity DISP and the depth Z from the other of the disparity DISP and the depth Z. For example, the calculation module 120 may obtain the disparity DISP from the depth Z according to the following equation:

$$DISP=((B*f)/Z);$$

where the notation f represents the focal length of each of two cameras respectively positioned at two ends O and O' of a baseline, and the notation B represents the distance between the two cameras. For example, in a situation where two lens modules in the electronic device have the same focal length, the two cameras can be these two lens modules. In addition, the focal length f can be a fixed value that is already known, and the distance B can also be already known.

According to some embodiments, during a preview procedure, the apparatus 100 may perform distance detection, and more particularly, may detect the distance between the target and the multifunctional mobile phone 200, and may notify the user of the detection result in real time, to allow the user to adjust the distance between the target and the multifunctional mobile phone 200, in order to obtain better capturing result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing multi-camera capturing control of an electronic device, the method comprising:
   obtaining a plurality of preview images, wherein the plurality of preview images are generated by using at least one lens module of the electronic device;
   generating at least one distance-related index according to characteristics of the plurality of preview images;
   selectively controlling a multi-camera capturing function based on the at least one distance-related index;
   enabling the multi-camera capturing function when the at least one distance-related index is within a predetermined range; and
   disabling output of the multi-camera capturing function when the at least one distance-related index is outside of the predetermined range, wherein disabling the output of the multi-camera capturing function includes preventing access to a user interface (UI) used for triggering the multi-camera capturing function of the electronic device.

2. The method of claim 1, wherein the at least one lens module comprises multiple lens modules of the electronic device.

3. The method of claim 2, wherein a stereo camera of the electronic device comprises the multiple lens modules of the electronic device.

4. The method of claim 1, wherein the at least one lens module comprises a single lens module of the electronic device; and any two preview images within the plurality of preview images are generated by using the single lens module at different time points, respectively.

5. The method of claim 1, wherein the at least one distance-related index corresponds to a specific region of at least one preview image within the plurality of preview images.

6. The method of claim 5, wherein the specific region of the at least one preview image comprises a whole region of the at least one preview image.

7. The method of claim 1, wherein the at least one distance-related index comprises at least one or a combination of a distance index, a disparity index, and a depth index.

8. The method of claim 7, wherein the at least one distance-related index corresponds to a specific region of at least one preview image within the plurality of preview images; and generating the at least one distance-related index according to the characteristics of the plurality of preview images comprises:
obtaining a plurality of disparity values corresponding to the specific region from a disparity map, selecting a representative disparity value of the plurality of disparity values, and utilizing the representative disparity value as the disparity index; or
obtaining a plurality of depth values corresponding to the specific region from a depth map, selecting a representative depth value of the plurality of depth values, and utilizing the representative depth value as the depth index.

9. The method of claim 1, wherein generating the at least one distance-related index according to the characteristics of the plurality of preview images comprises:
performing face detection on the plurality of preview images to generate the at least one distance-related index.

10. The method of claim 9, wherein generating the at least one distance-related index according to the characteristics of the plurality of preview images comprises:
performing the face detection on a specific preview image within the plurality of preview images to determine a specific face image in the specific preview image; and
determining a specific distance-related index within the at least one distance-related index according to at least one face parameter of the specific face image, wherein the specific distance-related index corresponds to the specific preview image, and the at least one face parameter of the specific face image comprises a face size of the specific face image and/or a face position of the specific face image.

11. The method of claim 1, wherein selectively controlling the multi-camera capturing function comprises:
when it is detected that a specific distance-related index within the at least one distance-related index is within the predetermined range, outputting a notification which indicates that the multi-camera capturing function of the electronic device is enabled.

12. The method of claim 1, wherein selectively controlling the multi-camera capturing function comprises:
when it is detected that the at least one distance-related index is within the predetermined range, enabling the multi-camera capturing function of the electronic device, and performing the multi-camera capturing function to capture multiple images in response to a user input.

13. The method of claim 12, further comprising:
after performing the multi-camera capturing function to capture the multiple images in response to the user input, performing a multi-view image processing based on the multiple images.

14. The method of claim 1, wherein the UI comprises at least one physical button of the electronic device and/or at least one virtual button on a touch sensitive display module of the electronic device.

15. The method of claim 1, wherein selectively controlling the multi-camera capturing function comprises:
when it is detected that each of the at least one distance-related index is outside of the predetermined range, outputting a warning information.

16. The method of claim 1, wherein controlling the multi-camera capturing function comprises:
when it is detected that the at least one distance-related index is within the predetermined range, automatically performing the multi-camera capturing function to capture multiple images.

17. An apparatus for performing multi-camera capturing control of an electronic device, the apparatus comprising:
a control circuit configured to obtain a plurality of preview images, wherein the plurality of preview images are generated by using at least one lens module of the electronic device; and
a calculator configured to generate at least one distance-related index according to characteristics of the plurality of preview images;
wherein the control circuit is further configured to:
selectively control a multi-camera capturing function based on the at least one distance-related index;
enable the multi-camera capturing function when the at least one distance-related index is within a predetermined range; and
disable output of the multi-camera capturing function when the at least one distance-related index is outside of the predetermined range, wherein when disabling the output of the multi-camera capturing function, the control circuit is further configured to prevent access to a user interface (UI) used for triggering the multi-camera capturing function of the electronic device.

18. The apparatus of claim 17, wherein the at least one distance-related index comprises at least one or a combination of a distance index, a disparity index, and a depth index.

19. A method for performing multi-camera capturing control of an electronic device, the method comprising:
obtaining a specific preview image, wherein the specific preview image is generated by using a lens module of the electronic device;
generating at least one distance-related index according to characteristics of the specific preview image;
selectively controlling a multi-camera capturing function based on the at least one distance-related index;
enabling the multi-camera capturing function when the at least one distance-related index is within a predetermined range; and
disabling output of the multi-camera capturing function when the at least one distance-related index is outside of the predetermined range, wherein disabling the output of the multi-camera capturing function includes preventing access to a user interface (UI) used for triggering the multi-camera capturing function of the electronic device.

20. The method of claim 19, wherein generating the at least one distance-related index according to the characteristics of the specific preview image comprises:
performing face detection on the specific preview image to determine a specific face image in the specific preview image; and determining a specific distance-related index within the at least one distance-related index according to at least one face parameter of the specific face image and according to a set of predetermined reference data regarding faces, wherein the specific distance-related index corresponds to the specific preview image, and the at least one face parameter of the specific face image comprises a face size of the specific face image and/or a face position of the specific face image.

21. The method of claim 1, further comprising:
capturing multiple images via the multi-camera capturing function;
determining that the preview images are different from the multiple images; and
outputting a warning notification based on the determination that the preview images are different from the multiple images.

* * * * *